US010142160B1

(12) United States Patent
Adams et al.

(10) Patent No.: US 10,142,160 B1
(45) Date of Patent: Nov. 27, 2018

(54) SYSTEM AND METHODS FOR MANAGING NETWORK HARDWARE ADDRESS REQUESTS WITH A CONTROLLER

(75) Inventors: Robert Edward Adams, San Mateo, CA (US); Daniel E. Talayco, Sunnyvale, CA (US); Mandeep Singh Dhami, San Jose, CA (US); Shudong Zhou, Fremont, CA (US); Kanzhe Jiang, Los Altos Hills, CA (US); Guido Appenzeller, Menlo Park, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 1024 days.

(21) Appl. No.: 13/252,966

(22) Filed: Oct. 4, 2011

(51) Int. Cl.
  *H04L 12/24* (2006.01)
(52) U.S. Cl.
  CPC ................... *H04L 41/04* (2013.01)
(58) Field of Classification Search
  USPC .................................................. 370/389, 254
  See application file for complete search history.

(56) References Cited

U.S. PATENT DOCUMENTS

| 6,424,654 | B1 | 7/2002 | Daizo |
| 6,937,602 | B2 | 8/2005 | Whitehill et al. |
| 7,231,660 | B1 | 6/2007 | Daude et al. |
| 7,260,648 | B2 | 8/2007 | Tingley et al. |
| 7,318,089 | B1 | 1/2008 | Stachura et al. |
| 7,337,224 | B1 | 2/2008 | Van Horne |
| 7,386,629 | B2 | 6/2008 | Rover et al. |
| 7,729,284 | B2 | 6/2010 | Ukrainetz et al. |
| 7,937,494 | B2 | 5/2011 | Droms et al. |
| 8,046,452 | B2 | 10/2011 | Hovell et al. |

(Continued)

FOREIGN PATENT DOCUMENTS

| DE | 102005006889 | 8/2006 |
| EP | 1613023 | 1/2006 |

(Continued)

OTHER PUBLICATIONS

Pfaff et al., OpenFlow Switch Specification, Dec. 31, 2009, 42 pages.

(Continued)

*Primary Examiner* — Gregory B Sefcheck
*Assistant Examiner* — Majid Esmaeilian
(74) *Attorney, Agent, or Firm* — Treyz Law Group, P.C.; Michael H. Lyons

(57) ABSTRACT

A controller may fulfill hardware address requests that are sent by source end hosts in a network to discover hardware addresses of destination end hosts. The controller may use network topology information to determine how to process the hardware address requests. The controller may retrieve a requested hardware address from a database of end hosts. If the controller is able to retrieve the hardware address of a destination end host from the database of end hosts, the controller may provide the source end host with a reply packet that contains the requested hardware address. If the controller is unable to retrieve the requested hardware address, the controller may form request packets to discover the address of the second end host and/or to discover a packet forwarding path between the source end host and the destination end host.

18 Claims, 16 Drawing Sheets

(56) References Cited

U.S. PATENT DOCUMENTS

| | | | |
|---|---|---|---|
| 8,099,764 B2 | 1/2012 | Herzog et al. | |
| 8,238,315 B2 | 8/2012 | Lambert | |
| 9,413,695 B1* | 8/2016 | Noureddine | H04L 49/35 |
| 2005/0091387 A1 | 4/2005 | Shinji | |
| 2006/0212560 A1 | 9/2006 | Purser | |
| 2006/0221925 A1 | 10/2006 | Beathard | |
| 2007/0250608 A1 | 10/2007 | Watt | |
| 2007/0286209 A1 | 12/2007 | Wang et al. | |
| 2008/0008148 A1 | 1/2008 | Sagawa | |
| 2008/0063002 A1 | 3/2008 | Zheng et al. | |
| 2008/0101381 A1 | 5/2008 | Sun et al. | |
| 2008/0189769 A1 | 8/2008 | Casado et al. | |
| 2008/0239956 A1 | 10/2008 | Okholm et al. | |
| 2009/0138577 A1* | 5/2009 | Casado et al. | 709/220 |
| 2009/0310582 A1 | 12/2009 | Beser et al. | |
| 2010/0082779 A1 | 4/2010 | Min | |
| 2010/0098073 A1* | 4/2010 | Tanaka et al. | 370/389 |
| 2010/0180016 A1 | 7/2010 | Bugwadia et al. | |
| 2010/0228879 A1 | 9/2010 | Wiget et al. | |
| 2011/0069621 A1 | 3/2011 | Gintis et al. | |
| 2011/0299537 A1* | 12/2011 | Saraiya et al. | 370/392 |
| 2012/0314605 A1 | 12/2012 | Akiyoshi | |
| 2013/0024553 A1 | 1/2013 | Mittal et al. | |
| 2013/0034104 A1* | 2/2013 | Yedavalli | H04L 41/12 370/400 |
| 2013/0125124 A1 | 5/2013 | Kempf et al. | |
| 2014/0254373 A1* | 9/2014 | Varma | H04W 40/36 370/235 |

FOREIGN PATENT DOCUMENTS

| | | |
|---|---|---|
| EP | 1615405 | 1/2006 |
| EP | 1780943 | 5/2007 |
| WO | 2011/108205 A | 9/2011 |

OTHER PUBLICATIONS

McKeown et al., OpenFlow: Enabling Innovation in Campus Networks, Mar. 14, 2008, 6 pages.
Cisco Systems, Cisco Catalyst 6500 Architecture, 1992-2007, 28 pages.
Adams et al., U.S. Appl. No. 13/220,431, filed Aug. 29, 2011.
Casado et al., "SANE: A Protection Architecture for Enterprise Networks," Usenix Security, Aug. 2006 (15 pages).
Casado et al., "Ethane: Taking Control of the Enterprise," Conference of Special Interest Group on Data Communication (SIGCOMM), Japan, Aug. 2007 (12 pages).
Koponen et al., "Onix: A Distributed Control Platform for Large-scale Production Networks," Usenix Security, Oct. 2010 (14 pages).
Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf.
Casado et al., "Ripcord: A Modular Platform for Data Center Networking", [Retrieved on Sep. 13, 2011]. Retrieved from the Internet<URL:http://www.eecs.berkeley.edu/Pubs/TechRpts/2010/EECS-2010-93.html.
Plummer, David C., "An Ethernet Address Resolution Protocol or Converting Network Protocol Addresses to 48.bit Ethernet Address for Transmission on Ethernet Hardware", Network Working Group Request for Comments: 826, Nov. 1982 (11 pages).
Japanese Technical Magazine, "Programming Network with OpenFlow", Jun. 11, 2011.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

SYSTEM AND METHODS FOR MANAGING NETWORK HARDWARE ADDRESS REQUESTS WITH A CONTROLLER

BACKGROUND

This relates to communication networks, and more particularly, to using a controller to manage hardware address discovery in network.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

End hosts that are coupled to network switches have network addresses and hardware addresses. A first end host communicates with a second end host by sending network packets with header fields that identify a network address and a hardware address of the second end host. In some scenarios, the end hosts have access to the network addresses of other end hosts but not to their hardware addresses. To discover the hardware address of the second end host, the first end host can flood the network with an address resolution protocol (ARP) request that identifies the second end host by its network address and requests that the second end host reply with its hardware address.

Flooding of a network to send ARP requests can undesirably load the network with unnecessary network traffic because the ARP requests can be sent to many end hosts that ignore the requests (e.g., because those end hosts are not associated with the network address identified in the ARP requests). The forwarding of unnecessary ARP requests can impact performance of the network. It would therefore be desirable to be able to provide improved arrangements for performing address discovery of end hosts in a network.

SUMMARY

A network may include client switches that are controlled by a controller and non-client switches that are not controlled by the controller. The client switches may be organized into groups that are separated by at least one of the non-client switches. The controller may fulfill hardware address requests that are received by client switches in the network. The hardware address requests may be sent from source end hosts that are coupled to the switches. A hardware address request that is sent from a source end host may request the hardware address (e.g., a Media Access Control address, Ethernet address, or other hardware address) of a destination end host.

A network packet received at a client switch may be forwarded to the controller by the client switch. The controller server may retrieve packet information from packet header fields of the packet to determine whether or not the network packet is an ARP request packet. In response to determining that the network packet is an ARP request packet, the controller may use network topology information to determine how to process the hardware address request. The controller may retrieve a requested hardware address from a database of end host addresses. The database may be updated with address information retrieved from network packets that flow through the network.

If the controller is able to retrieve the hardware address of a destination end host that is requested by a source end host from the database of end host addresses, the controller may provide the source end host with a reply packet that contains the requested hardware address. If the controller is unable to retrieve the requested hardware address, the controller may form modified request packets to discover the hardware address of the destination end host and/or to discover a packet forwarding path between the source end host and the destination end host.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
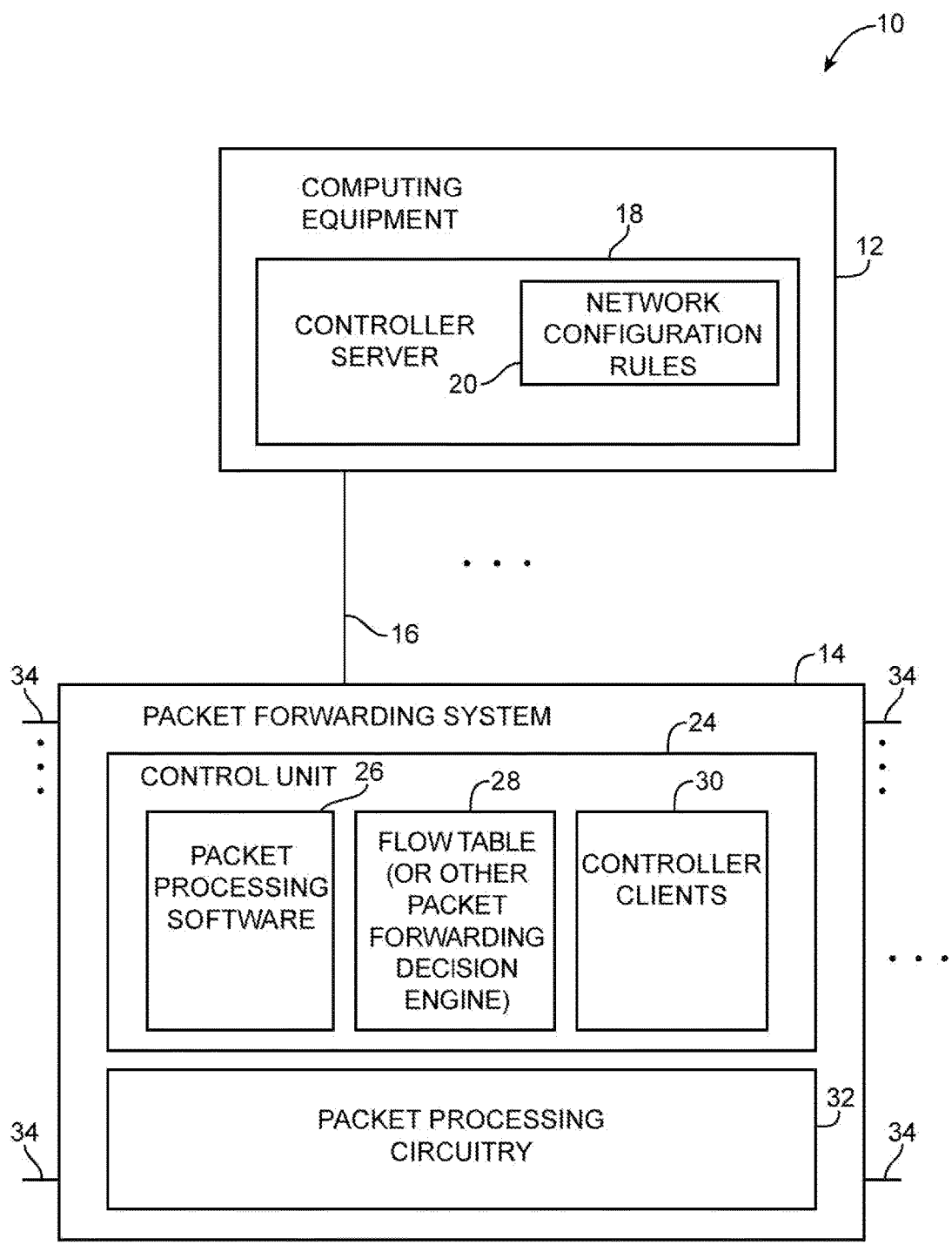
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets throughout the network to discover network connections between client switches. As another example, controller server 18 may instruct client switches to send switch capabilities information to controller server 18 and/or monitor network traffic to maintain a database of end hosts that are coupled to switches in the network. Controller server 18 may use network topology information and information relating to the capabilities of network equipment to determine appropriate paths for packets flowing through the network. Once appropriate paths have been identified, controller server 18 may send corresponding settings data to the hardware in network 10 to ensure that packets flow through correct paths. Network configuration operations such as these may be performed during system setup operations, continuously in the background, or in response to the appearance of new data packets (e.g., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34. Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. Any packet forwarding decision engine may be used to assist packet forwarding system 14 to make decisions about how to forward network packets. For example, packet forwarding decision engines 28 may direct packet forwarding system 14 to forward network packets to predetermined ports based on attributes of the network packets (e.g., based on network protocol headers).

Figure 2:
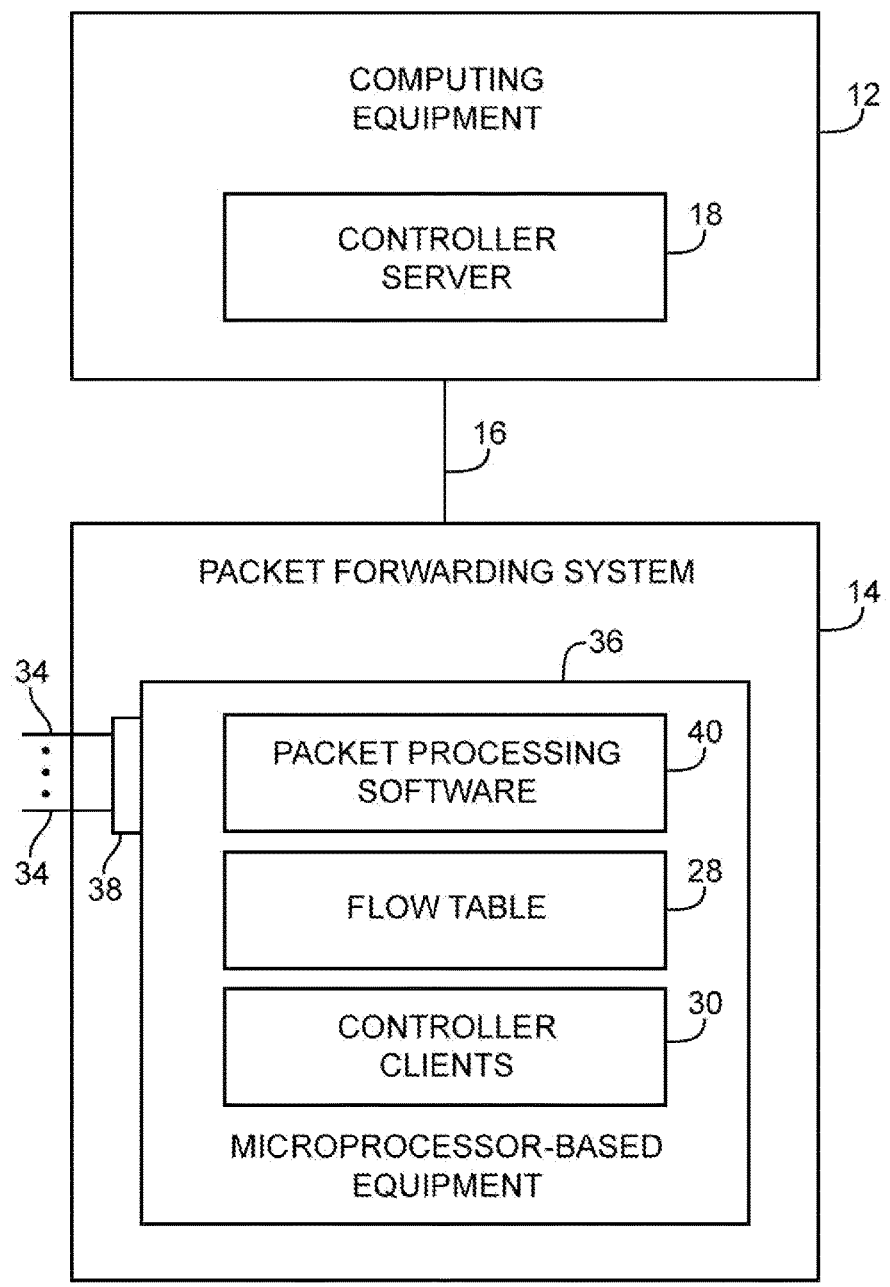
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
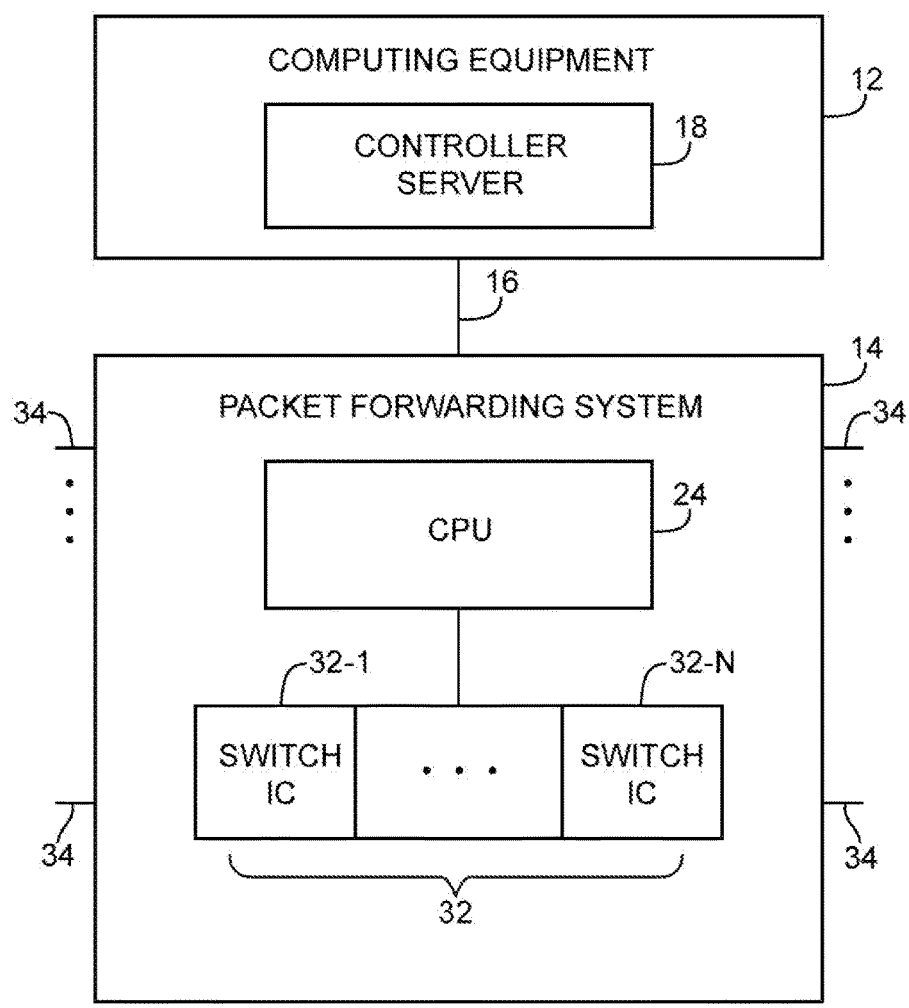
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
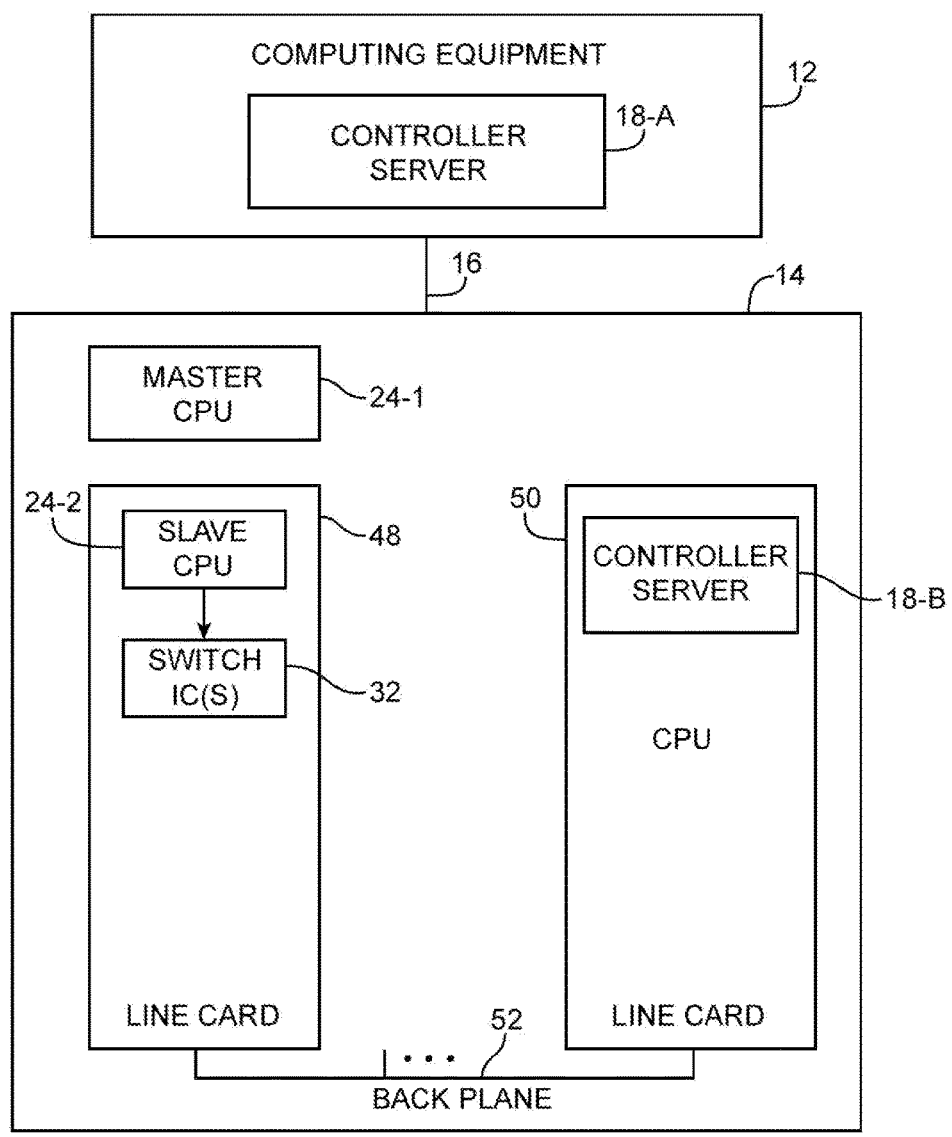
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch (packet forwarding system) 14 may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
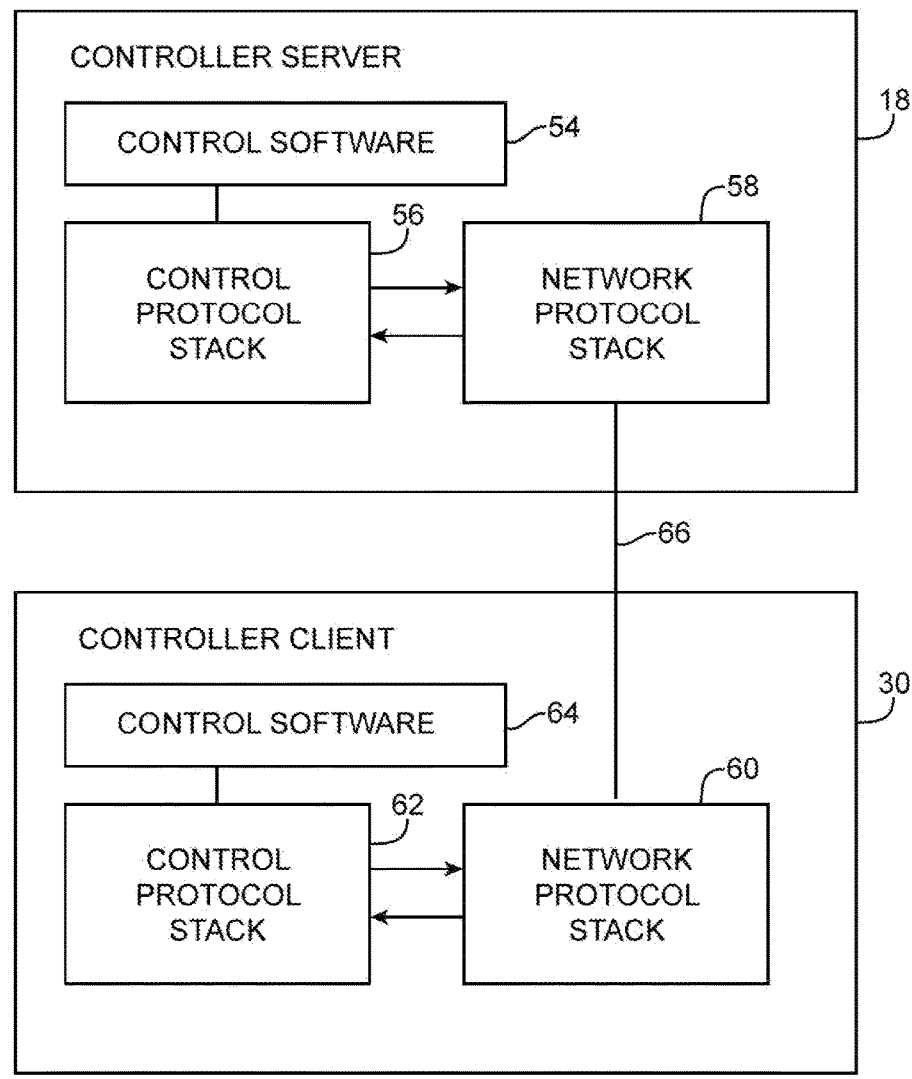
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
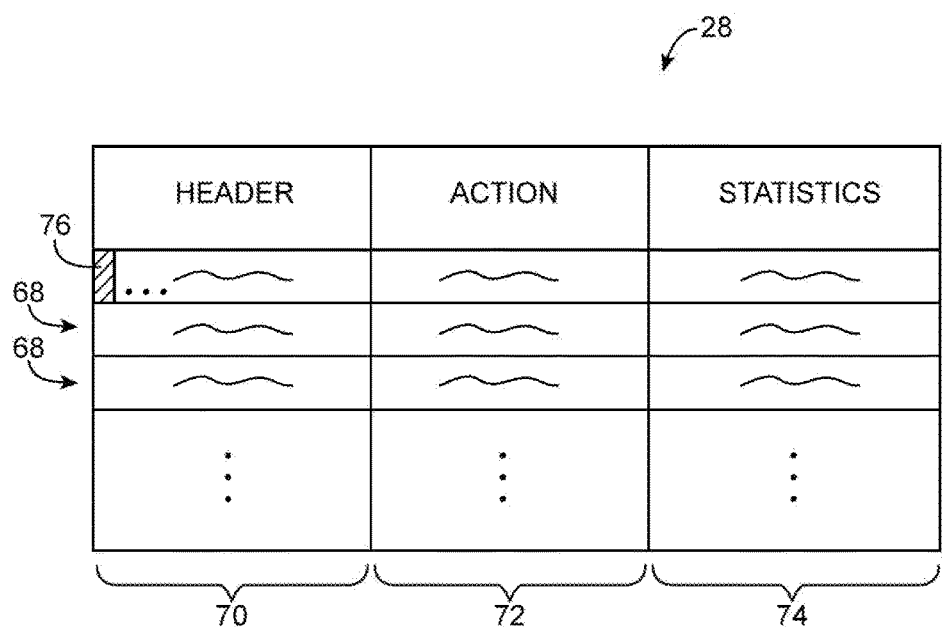
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (row) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) id, VLAN priority, IP source address, IP destination address, IP protocol, IP ToS (type of service) bits, Transport source port/ Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum spanning tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
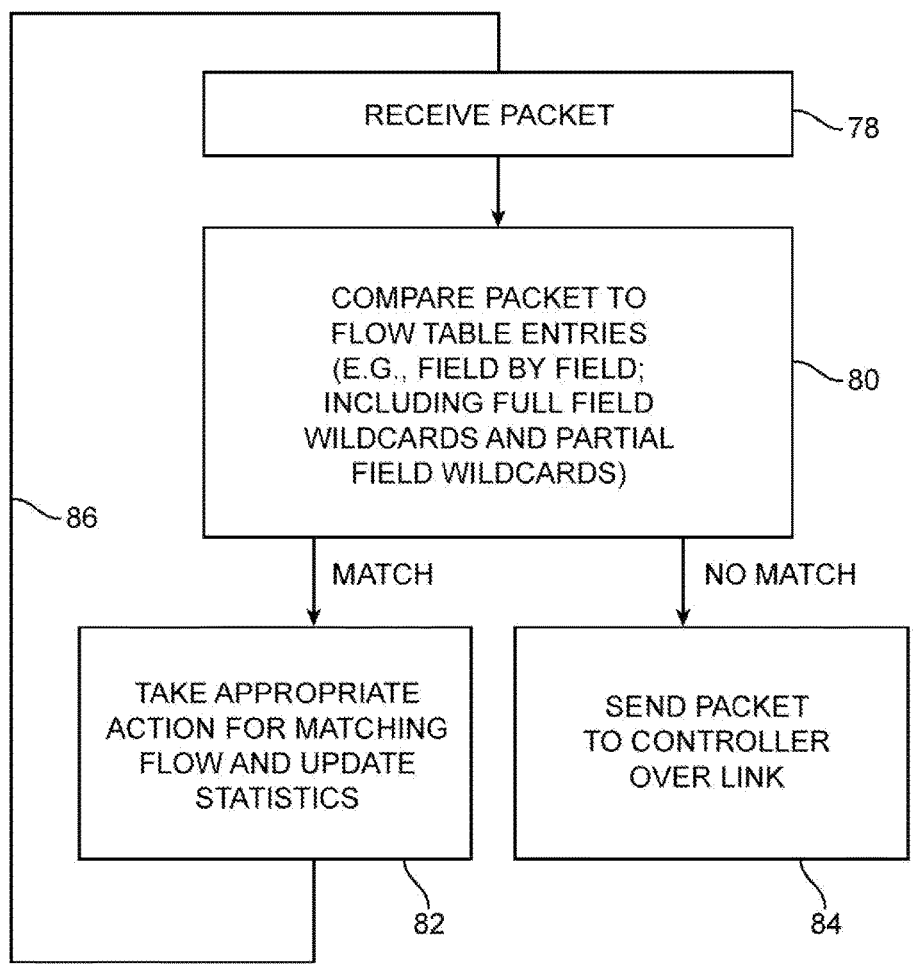
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
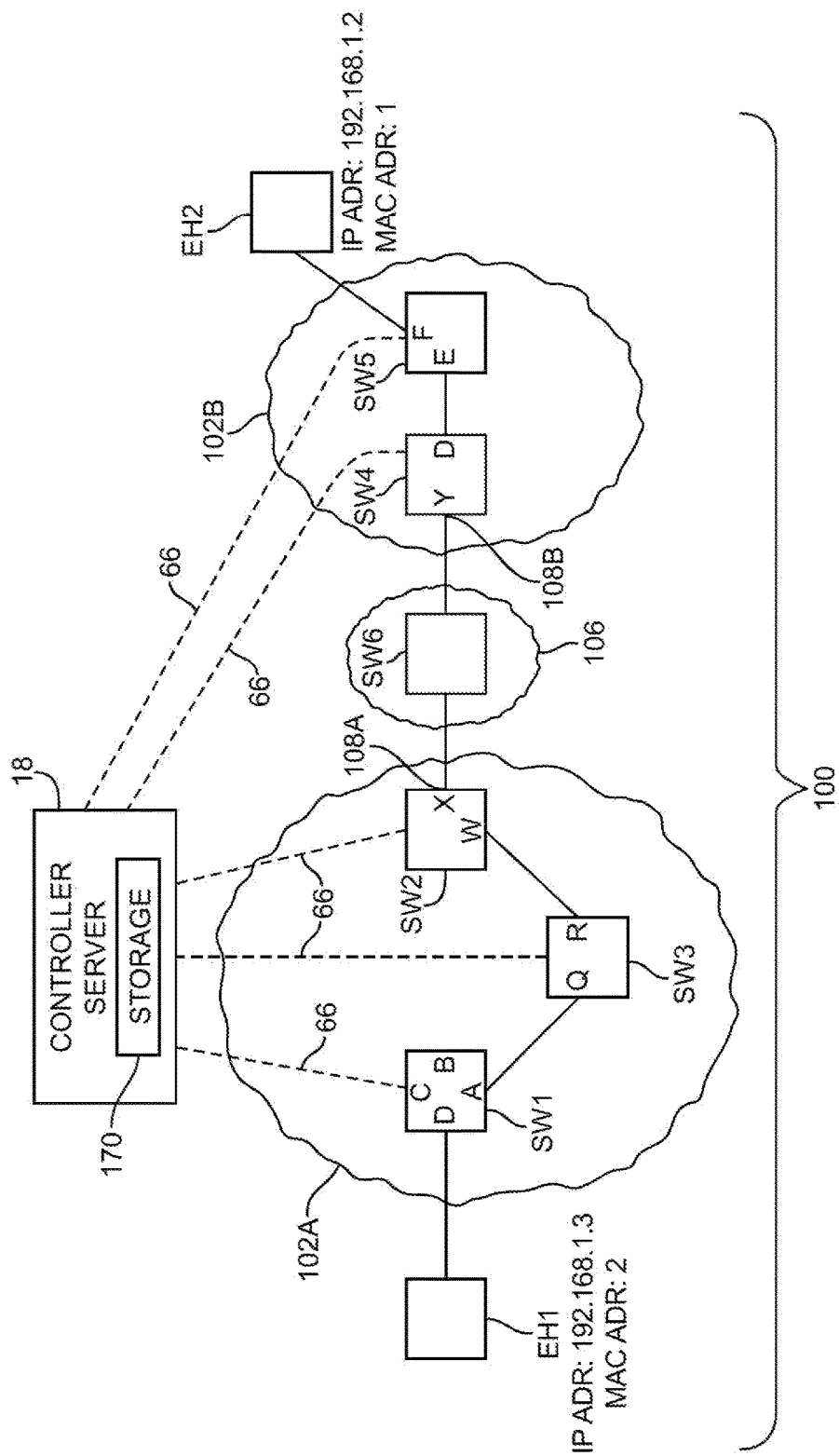
FIG. 8 is a diagram of an illustrative network in which a first end host may communicate with a second end host through switches in accordance with an embodiment of the present invention.

A controller (e.g., a controller server or other controllers implemented on computing equipment) that controls a network of switches may gather or monitor network information such as network topology or information associated with end hosts. The controller may include one or more controller servers or may be distributed throughout one or more of the switches. The controller may monitor the network locations of end hosts or monitor connections between switches in the network. The controller may reduce traffic load on the network by using the network information to control communications between end hosts. FIG. 8 shows an illustrative network 100 with switches (e.g., or other packet processing systems) that may be controlled by controller server 18.

As shown in FIG. 8, network 100 may include switches SW1, SW2, SW3, SW4, SW5, SW6. Some of the switches may include controller clients and therefore be referred to as client switches (e.g., switches SW1, SW2, SW3, SW4, and SW5 may be referred to as client switches). Controller server 18 may communicate with the client switches via network paths 66 (e.g., to provide the client switches with instructions or receive information from the client switches). Some of the switches may lack controller clients and therefore be referred to as non-client switches (e.g., switch SW6 may be referred to as a non-client switch). Each switch may include respective physical ports (e.g., switch SW1 may include ports A, B, C, and D, switch SW5 may include ports E and F, etc.).

End hosts EH1 and EH2 may communicate through the network by sending network traffic to respective ports to which they are coupled. For example, to communicate with end host EH2, end host EH1 may send a network packet to port D of client switch SW1. In this scenario, client switch SW1 may examine a corresponding flow table to determine whether or not a flow table entry exists for the network packet that was sent from end host EH1. Client switch SW1 may determine that no appropriate flow table entry exists (e.g., because controller server 18 has not yet generated a packet forwarding path through the client switches between end hosts EH1 and EH2). Client switch SW1 may then forward the network packet to controller server 18. Controller server 18 may obtain information such as packet source and packet destination information from the network packet and use the information to generate a packet forwarding path for network packets between end hosts EH1 and EH2 (e.g., by sending appropriate flow table entries to each of the client switches associated with a packet forwarding path between end hosts EH1 and EH2). As an example, controller server 18 may generate a packet forwarding path through client switches SW1, SW3, SW2, SW4, and SW5.

Network packets sent between end hosts include information relating to the end hosts. A network packet sent from end host EH1 to end host EH2 may include packet source information and packet destination information. The packet source information may include a source hardware address (e.g., a source MAC address or other hardware address that is associated with the source end host) and a source network address (e.g., a source IP address or other network protocol address corresponding to the source end host). The packet destination information may include a destination hardware address (e.g., a destination MAC address that corresponds to the destination end host) and a destination network address (e.g., a destination IP address corresponding to the destination end host). MAC addresses may sometimes be referred to as Ethernet hardware addresses. End host EH1 may have a MAC address of 2 and end host EH2 may have a MAC address of 1. These examples are merely illustrative. End host EH1 and end host EH2 may have any desirable MAC address (or other hardware addresses). If desired, the MAC addresses may be displayed in a separated hex format. For example, MAC address 1 may be displayed as 00:00:00:00:00:01 and MAC address 2 may be displayed as 00:00:00:00:00:02.

End hosts may have incomplete knowledge of the network addresses of other end hosts. Consider a scenario in which end host EH1 wishes to communicate with end host EH2, but only knows the IP address of end host EH2. To send network packets to end host EH2, end host EH1 must first discover the MAC address of end host EH2 (e.g., end host EH1 must obtain the MAC address of end host EH2 to form network packets with correct packet destination information). To discover the MAC address of end host EH2, end host EH1 may transmit the address resolution packet (ARP) request packet 122 of FIG. 9A.

Figure 9A:
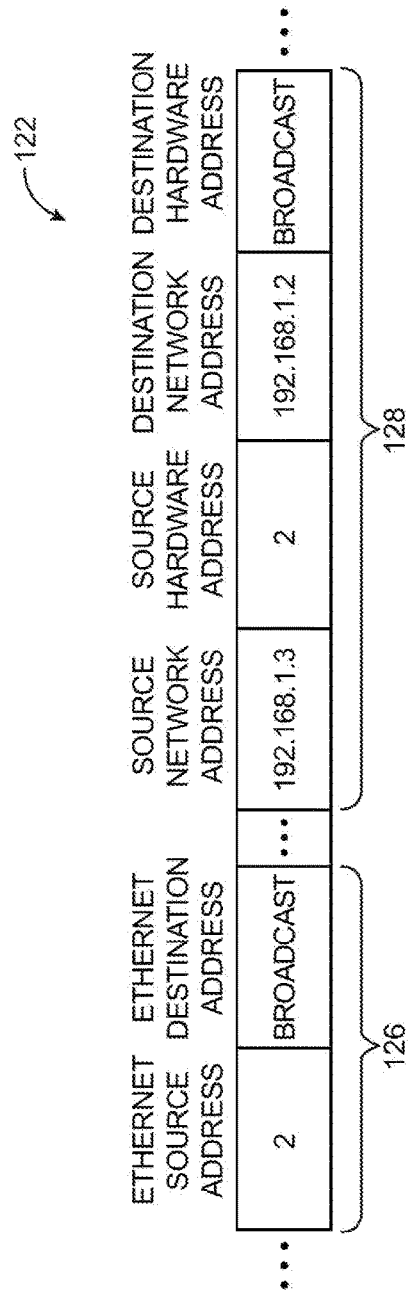
FIG. 9A is an illustrative ARP request that may be sent by a first end host to discover the hardware address of a second end host in accordance with an embodiment of the present invention.

As shown in FIG. 9A, ARP request packet 122 may include a source network address (e.g., an IP address) field, source hardware address (e.g., a MAC address) field, destination network address field, and destination hardware address field. End host EH1 may provide its own IP and MAC addresses in the source network address and source hardware address fields (i.e., 192.168.1.3 and 2, respectively). End host EH1 may provide the destination IP address of end host EH2 (i.e., 192.168.1.2) in the destination network address field and identify that ARP request packet 122 should be broadcasted to all MAC addresses (e.g., by providing a broadcast MAC address such as FF:FF:FF:FF:FF:FF in the destination MAC address field).

ARP request packet 122 may be sent as an Ethernet frame (e.g., a data packet sent through Ethernet links between switches of network 100). The Ethernet frame may include ARP fields 128 and Ethernet header fields 126. ARP fields 128 may include the source network address field, source hardware address field, destination network address field, and destination hardware address field and may be formed as part of an Ethernet payload (e.g., a data portion of the Ethernet frame). Ethernet header fields 126 may include an Ethernet source address of 2 and a broadcast Ethernet destination address (e.g., a broadcast Ethernet address such as FF:FF:FF:FF:FF:FF). The destination hardware address field of ARP fields 128 may be optional, as the Ethernet destination address may already indicate that ARP request packet 122 should be broadcasted to all end hosts in network 100.

By indicating that ARP request packet 122 should be broadcasted to every end host, end host EH1 may flood network 100 with ARP requests. Each switch in network 100 that receives ARP request packet 122 may forward the packet to each port of that switch. Each end host that receives ARP request packet 122 may compare the destination IP address field of the packet with the IP address of that end host. When end host EH2 receives ARP request packet 122, end host EH2 may identify that the destination IP address field matches the IP address of end host EH2 and send an ARP reply packet that includes the MAC address of end host EH2 to end host EH1. In this way, end host EH1 may obtain address information necessary to send network packets to end host EH2.

ARP request packet 122 may be referred to as a broadcast packet, because ARP request packet 122 may be forwarded to all end hosts in network 100 (e.g., ARP request packet 122 may be flooded throughout network 100 to each end host). Network packets such as ARP replies that are destined for a given end host (e.g., sent to a specific IP address and MAC address) may sometimes be referred to as unicast packets, because they are destined for a single end host.

The flooding of ARP request packet 122 throughout network 100 may undesirably increase network load. The amount of network traffic generated by a first end host to discover the hardware address of a second end host may be related to the number of switches and end hosts in the network (e.g., because each switch that receives ARP request packet 122 may broadcast the packet to other switches and end hosts that are coupled to that switch).

To reduce network load, controller server 18 may instruct client switches to forward ARP requests to controller server 18 instead of broadcasting the requests (e.g., by providing appropriate flow table entries to the client switches). In response to receiving an ARP request packet from a client switch, controller server 18 may retrieve the destination IP address (and/or other packet information) from the ARP request packet. Controller server 18 may use information known about the topology of the network to identify a hardware address (e.g., MAC address) that corresponds to the destination IP address retrieved from the ARP request packet. For example, controller server 18 may maintain a database in storage 170 of end hosts that are known to be connected to network 100. The database may include entries that each identifies a respective end host by a corresponding IP address, hardware address, and the location of that end host within the network. For example, end host EH1 of network 100 may be identified by a database entry including "IP address: 192.168.1.3, MAC address: 2, and location: port D of switch SW1." The entries in the end host database may be updated to reflect current network attributes. For example, an entry corresponding to end host EH1 may be updated based on information retrieved from network packets sent from end host EH1 through the network.

Figure 9B:
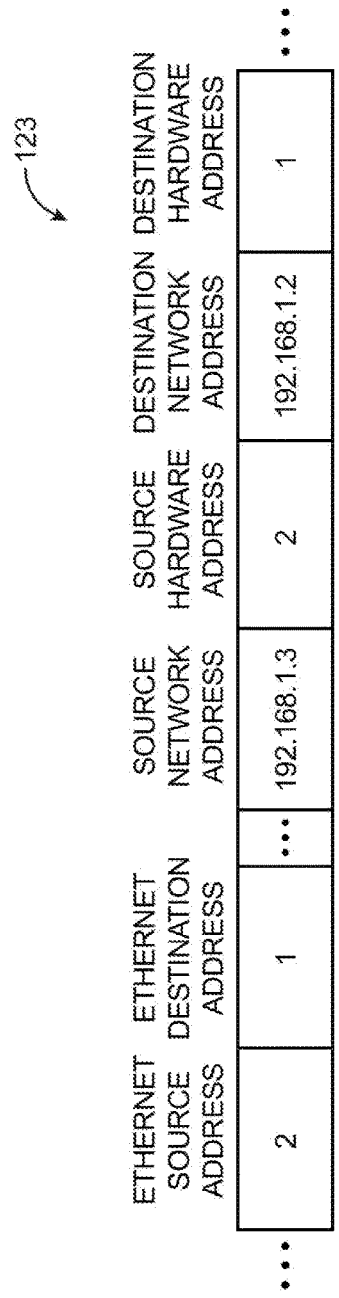
FIG. 9B is an illustrative unicast ARP request in accordance with an embodiment of the present invention.

If a MAC address (e.g., an Ethernet hardware address) corresponding to the destination IP address of the ARP request packet is identified (e.g., using a database of end host information), controller server 18 may convert the broadcast ARP request packet into a unicast ARP request and instruct client switches in network 100 to forward the unicast ARP request directly to the end host corresponding to identified MAC address (e.g., instead of flooding the network with the broadcast ARP request). FIG. 9B shows an illustrative unicast ARP request 123 that may be generated by controller server 18 from ARP request 122.

As shown in FIG. 9B, unicast ARP request 123 may include an Ethernet destination address of 1 and a destination hardware address of 1. Unicast ARP request 123 may be generated from broadcast ARP request 122 by replacing the broadcast address used in the Ethernet destination address and destination hardware address fields with the hardware address of end host EH2 (e.g., the hardware address of the end host that would have replied to broadcast ARP request 122).

Controller server 18 may instruct client switches in network 100 to forward unicast ARP request 123 directly to end host EH2 by providing the client switches with appropriate flow table entries that instruct the client switches to forward ARP request 123 along a network switch forwarding path from end host EH1 to end host EH2. If desired, controller server 18 may provide the client switches with flow table entries to forward corresponding ARP replies from end host EH2 to end host EH1. By converting broadcast ARP request 122 into a directed ARP request such as unicast ARP request 123, controller server 18 may reduce unnecessary network load and improve network performance, because fewer ARP request packets may be forwarded through the network.

If desired, controller server 18 may provide unicast ARP request 123 to client switches in response to determining that end host EH2 is not known. For example, if controller server 18 cannot identify a MAC address that corresponds to the destination IP address of the ARP request packet, controller server 18 may convert the broadcast ARP request packet into unicast ARP request packet 123 and instruct client switch SW1 to forward the unicast ARP request from each of the ports of client switch SW1.

By converting a broadcast ARP request packet into multiple unicast request packets, controller server 18 may reduce network traffic associated with fulfilling the ARP request, because any network switches that have already discovered the location of end host EH2 may forward the ARP request directly to end host EH2 (e.g., instead of forwarding the ARP request to controller server 18 or broadcasting ARP requests). For example, non-client switch SW6 may have discovered a route to end host EH2 by monitoring packets received at non-client switch SW6. As another example, client switches SW4 and SW5 may have already been provided flow table entries to route packets to end host EH2. In the above examples, the switches that have already discovered the location of end host EH2 may forward unicast ARP request 123 directly to end host EH2.

If desired, controller server 18 may instruct client switches in network 100 to forward ARP requests only to ports that are not coupled to other client switches. For example, Controller server 18 may identify client switches that are coupled to at least one end host or non-client switch using network topology information that is gathered during setup of network 100 or is continuously gathered during operation of network 100. In this scenario, controller server 18 may provide ARP requests (e.g., ARP request 122 or 123) to the identified client switches and instruct those client switches to send the ARP requests from ports that are not coupled to other client switches (e.g., to ports coupled to non-client switches or end hosts). By instructing client switches to forward ARP requests only to ports that are not coupled to other client switches, controller server 18 may reduce network traffic associated with fulfilling the ARP requests (e.g., because the ARP requests may not be sent between client switches).

Figure 10:
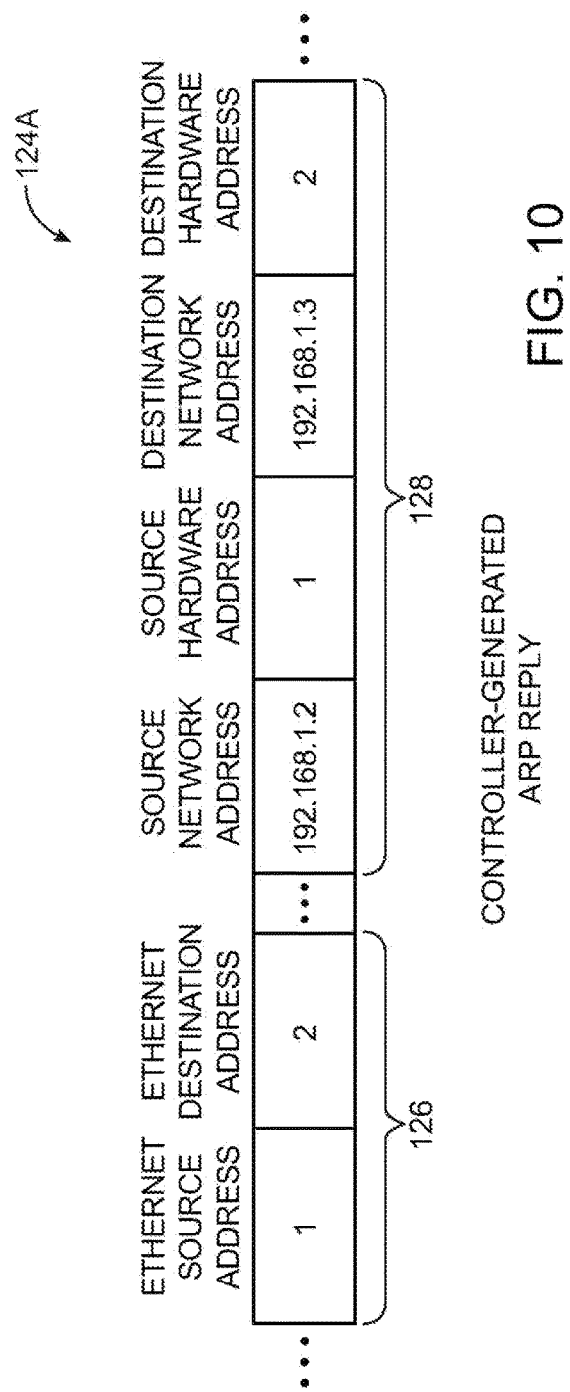
FIG. 10 is an illustrative controller-generated ARP reply in accordance with an embodiment of the present invention.

If desired, controller server 18 may generate an ARP reply for the ARP request packet and send the controller-generated ARP reply to the end host that sent the ARP request packet (e.g., instead of forwarding the ARP request packet to the ARP destination end host). FIG. 10 shows an illustrative controller-generated ARP reply packet 124A that may be provided by controller server 18 to end host EH1 in response to ARP request 122 of FIG. 9A.

As shown in FIG. 10, controller-generated ARP reply 124A may include Ethernet header fields 126 and ARP information fields 128. Ethernet header fields 126 may include an Ethernet source address of 1 (e.g., the hardware address of end host EH2) and an Ethernet destination address of 2 (e.g., the hardware address of end host EH1). ARP information fields 128 may be formed as part of an Ethernet payload or data portion and may include a source network address of 192.168.1.2, a source hardware address of 1, a destination network address of 192.168.1.3, and a destination hardware address of 2. Controller-generated ARP reply 124A may be identical to the ARP reply that would have been sent from end host EH2 to end host EH1 (e.g., as if end host EH2 had generated the ARP reply).

ARP reply packet 124A may be sent from controller server 18 to end host EH1 through a client switch that is coupled to end host EH1 (e.g., switch SW1), through a client switch that is coupled to end host EH2, or through any desirable client switch in network 100 that can forward network packets to end host EH1. For example, controller server 18 may send ARP reply packet 124A to switch SW1 via network path 66 and instruct switch SW1 to forward the packet to end host EH1 via port D. By responding to ARP request 122 from end host EH1 with controller-generated ARP reply 124A, controller server 18 may reduce unnecessary network traffic associated with broadcasting of ARP request 122 by switches in network 100.

Controller server 18 may maintain a database of end hosts by monitoring traffic on network 100 to add and modify entries in the database. For example, controller server 18 may monitor network packets such as ARP request packets that are sent from any given end host to identify whether the end host is known (e.g., an entry for that end host exists in the database) or whether a corresponding entry for that end host should be updated or added to the database. The network packets may be monitored by retrieving packet information such as header fields from the network packets.

Controller server 18 may organize client switches in network 100 into clusters (groups) of client switches (sometimes referred to as client switch clusters). Client switch clusters may be separated by non-client switches (e.g., a first client switch cluster may be separated from a second client switch cluster by one or more non-client switches). Switches SW1, SW2, and SW3 may be organized into a first client switch cluster 102A and switches SW4 and SW5 may be organized into a second client switch cluster 102B. Client switch clusters 102A and 102B may be separated by non-client switch SW6. A client switch cluster may include end hosts that are coupled to the client switches of the cluster (e.g., coupled directly to the client switches or coupled through non-client switches). A client switch cluster associated with an end host that sends a network packet may be referred to as a source client switch cluster or source cluster. A client switch cluster associated with an end host that receives a network packet may be referred to as a destination client switch cluster or destination cluster.

Client switch clusters may be coupled to non-client switches via ports of client switches within the client switch clusters. For example, client switch cluster 102A may be coupled to non-client switch SW6 via port X and client switch cluster 102B may be coupled to client switch SW6 via port Y. The ports at which non-client switches are coupled to the client switch clusters may be referred to as attachment points or cluster interface ports. For example, port X may be referred to as cluster interface port 108A of cluster 102A and port Y may be referred to as cluster interface port 108B of cluster 102B.

Client switches in a given client switch cluster may be coupled to other client switches in that client switch cluster via forwarding paths that do not include non-client switches. For example, client switch SW1 is coupled to client switch SW2 through client switch SW3. Client switches in different client switch clusters may be coupled via network paths that include non-client switches. For example, client switch SW2 may communicate with client switch SW4 by sending network packets through non-client switch SW6.

It may be desirable for controller server 18 to determine forwarding paths through client switches in the network using ARP requests that are sent by end hosts. Controller server 18 may use forwarding paths determined in this way to control client switches in network 100. For example, controller server 18 may use a forwarding path determined using an ARP request from a first end host to a second end host to provide appropriate flow table entries to the client switches so that future network traffic between the first and second end hosts is forwarded along the determined forwarding path through the client switches.

Consider a scenario in which controller server 18 does not know the network topology between cluster 102A and 102B (e.g., controller server 18 may have limited information regarding non-client switches such as SW6, because controller server 18 is unable to control non-client switches). In this scenario, it may be desirable for controller server 18 to use an ARP request that is broadcasted from end host EH1 to end host EH2 to help identify the network topology between clusters 102A and 102B (e.g., to determine forwarding paths from end host EH1 to end host EH2).

To use a broadcast ARP request to determine forwarding paths between a first end host that is coupled to a first client switch cluster and a second end host that is coupled to a second client switch cluster, controller server 18 may convert the broadcast ARP request into a unicast ARP request and instruct switches in the first client switch cluster to send the unicast ARP request from ports that are coupled to non-client switches. The ports in a given client switch cluster that are coupled to non-client switches may be referred to as attachment points or cluster interface ports, because that client switch cluster may be coupled to non-client switches at those ports. Controller server 18 may instruct client switches in the first client switch cluster to send the unicast ARP request to non-client switches by providing packet forwarding rules (e.g., flow table entries) that direct the client switches in the first client switch cluster to forward the unicast ARP request from ports that are coupled to non-client switches. If desired, controller server 18 may bypass intermediate client switches in the first client switch cluster by directly providing client switches in the first client switch cluster that are coupled to non-client switches with the unicast ARP request and instructing those client switches to forward the unicast ARP request to the non-client switches.

As an example, controller server 18 may convert broadcast ARP request 122 into unicast ARP request 123 and instruct client switch SW2 of network 100 to forward unicast ARP request 123 to non-client switch SW6 via port X. In this scenario, non-client switch SW6 may receive unicast ARP request 123 and forward the unicast ARP request to client switch SW4 (e.g., after identifying which port of non-client switch SW6 is associated with end host EH2). Client switch SW4 may receive unicast ARP request 123 from non-client switch SW6 and forward the request to controller server 18. In response to receiving unicast ARP request 123 from non-client switch SW6, controller server 18 may determine that a packet forwarding path between client switch cluster 102A and client switch cluster 102B exists from port X of switch SW2 to port Y of switch SW4. Controller server 18 may then direct the client switches to forward unicast ARP request 123 along the identified packet forwarding path to end host EH2 (e.g., so that end host EH2 can generate a corresponding ARP reply) or provide end host EH1 with a controller-generated ARP reply.

Non-client switches such as switch SW6 of network 100 may use ARP requests to associate hardware addresses (e.g., MAC addresses) with switch ports. For example, a non-client switch that receives a controller-generated ARP reply at a given port may associate the Ethernet source address of the ARP reply with the given port. Future network packets destined for that Ethernet address may be sent by the non-client switch from the given port, because the non-client switch assumes that the end host corresponding to that Ethernet address can be reached via that port. In some scenarios, the non-client switches may incorrectly learn associations from controller-generated ARP replies 124.

Figure 11:
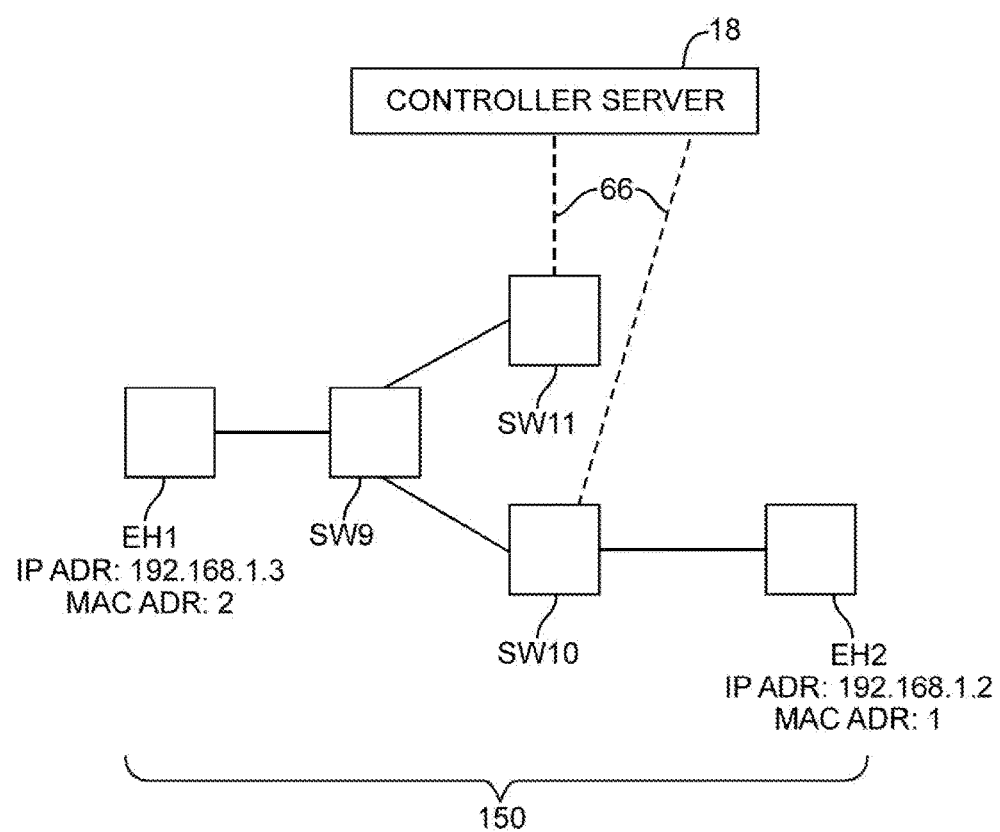
FIG. 11 is a diagram of an illustrative network in which a first end host may be coupled to client switches via an intermediate non-client switch in accordance with an embodiment of the present invention.

To prevent non-client switches from learning incorrect associations, it may be desirable for controller server 18 to form controller-generated ARP replies with the Ethernet source address set to a hardware address that is reserved by controller server 18. FIG. 11 shows an illustrative scenario in which controller server 18 may form a controller-generated ARP reply with a reserved hardware address. As shown in FIG. 11, network packets transmitted from end host EH1 to end host EH2 must first traverse non-client switch SW9 (e.g., because end host EH1 is coupled to non-client switch SW9). To discover the hardware address of end host EH2, end host EH1 may send ARP request 122 of FIG. 9A to non-client switch SW9. In this scenario, non-client switch SW9 may broadcast ARP request 122 by forwarding the request to each switch that is coupled to non-client switch SW9 (i.e., client switches SW11 and SW10). In response to receiving broadcasted ARP request 122, client switches SW10 and SW11 may each forward ARP request 122 to controller server 18 via network paths 66.

Controller server 18 may be unable to differentiate between ARP requests 122 that are received from client switches SW11 and SW10, because both requests may originate from non-client switch SW9. If controller server 18 were to respond to ARP requests received at client switches SW11 and SW10 from end host EH1 with controller-generated ARP replies that have the Ethernet source address of end host EH2, non-client switch SW9 can potentially learn incorrect forwarding paths for network traffic that is destined for end host EH2 (e.g., non-client switch SW9 may incorrectly associate end host EH2 with client switch SW11).

Figure 12:
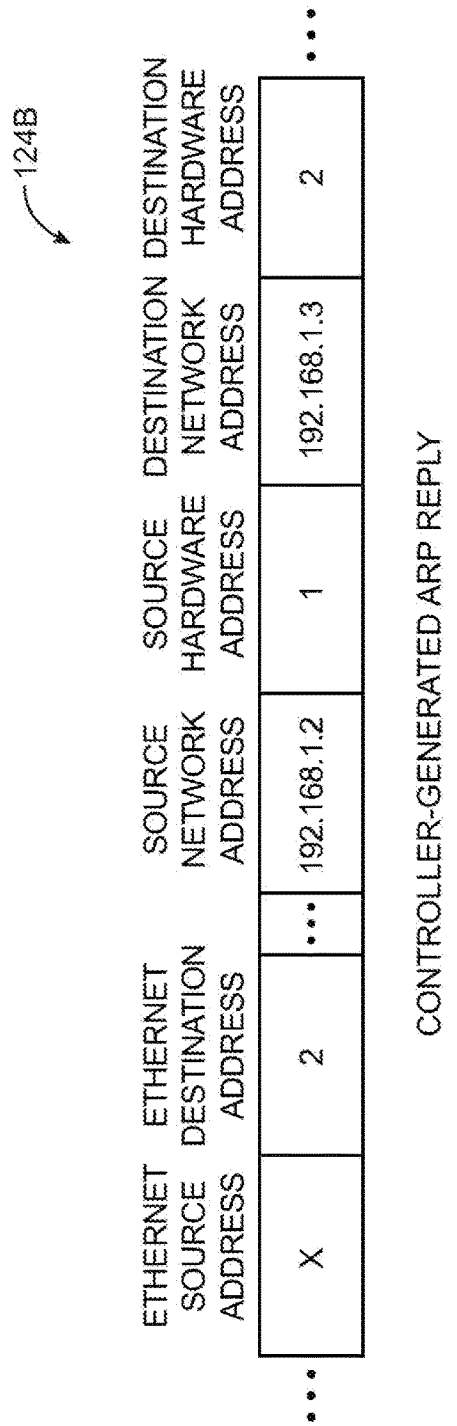
FIG. 12 is an illustrative controller-generated ARP reply using a reserved hardware source address in accordance with an embodiment of the present invention.

To prevent non-client switches from learning incorrect forwarding paths, controller server 18 may use a reserved hardware address for the Ethernet source address field of a controller-generated ARP reply. FIG. 12 shows an illustrative controller-generated ARP reply 124B that may be generated by controller server 18 in response to an ARP request 122 that is broadcasted by end host EH1 of FIG. 11. As shown by FIG. 12, controller-generated ARP reply 124B may include a reserved hardware address X used in the Ethernet source address field. Reserved hardware address X may be a hardware address (e.g., a MAC address) that is not used by other devices (e.g., switches, end hosts, etc.) in network 100.

By using a reserved hardware address in the Ethernet source address field, controller server 18 may prevent non-client switches such as switch SW9 of FIG. 11 from learning incorrect forwarding paths from controller-generated ARP reply 124B. For example, if non-client switch SW9 receives controller-generated ARP reply packets 124B from client switches SW10 and SW11, non-client switch SW9 may associate the reserved hardware address X with ports of switch SW9 that are coupled to client switches SW10 and SW11. The associations that are learned by non-client switch SW9 may not affect the forwarding of normal traffic through network 150, because normal traffic may not be sent to reserved hardware address X (e.g., because reserved hardware address X is not associated with any end host).

Figure 13:
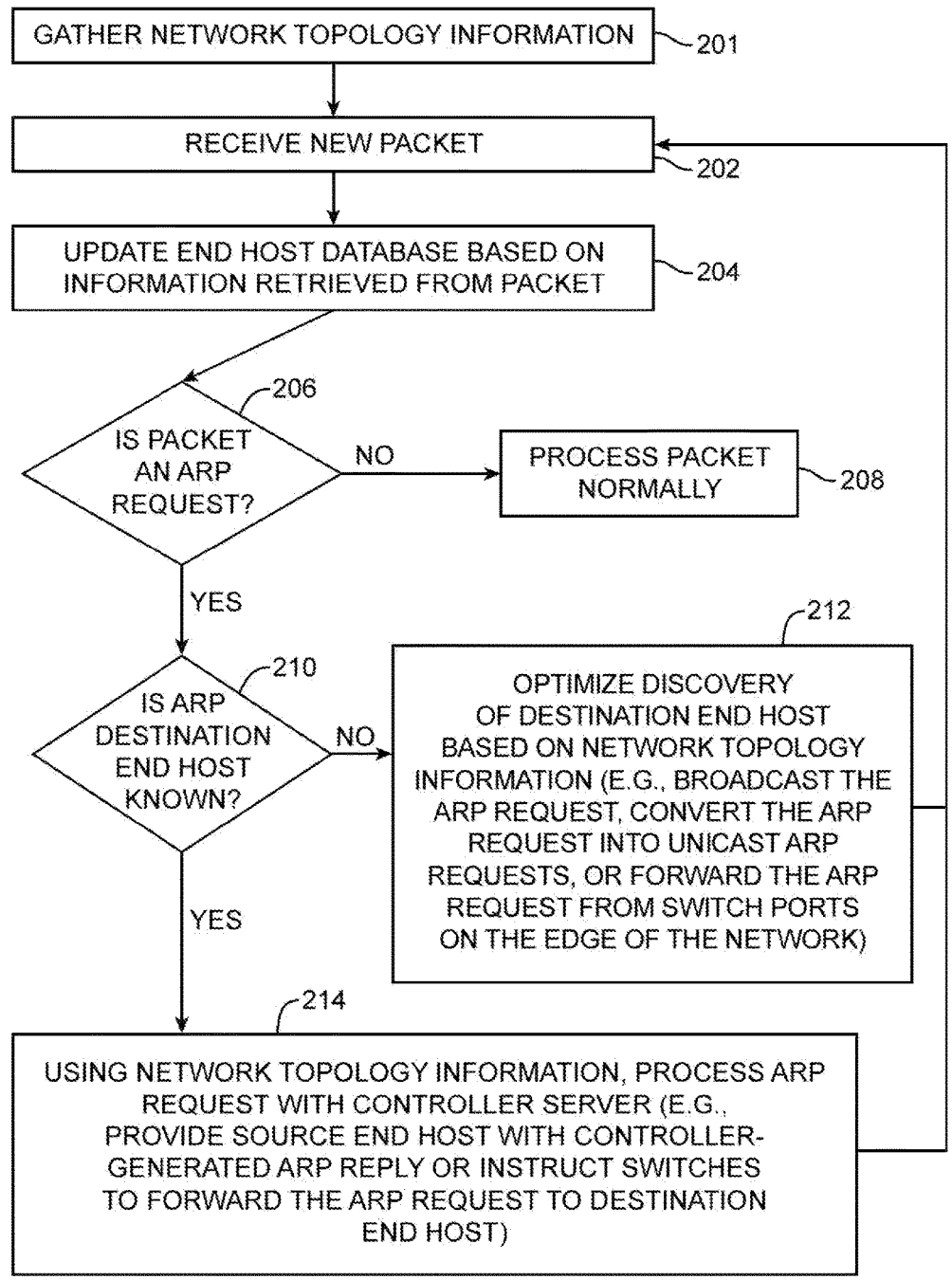
FIG. 13 is a flow chart of illustrative steps that may be performed by a controller to reduce network traffic based on network topology information in accordance with an embodiment of the present invention.

To process network packets such as ARP requests that are received at client switches in a network, controller server 18 may perform the illustrative steps of the flowchart of FIG. 13.

In step 201, controller server 18 may gather network topology information. The network topology information may include connections between network switches, end host information such as network addresses and hardware addresses, or other network information. The network topology information may be obtained by instructing client switches in the network to forward network information such as switch capabilities and connections. For example, controller server 18 may instruct client switches to send link layer discovery protocol (LLDP) messages to discover connections between ports of client switches. Controller server 18 may use the network topology information to organize client switches into client switch clusters that are separated by non-client switches. Controller server 18 may gather network topology during initial setup of the network and/or continuously during operation of the network (e.g., while network packets are forwarded through the network).

In step 202, controller server 18 may receive a new packet. The new packet may be received from an end host via a client switch that forwards the new packet to controller server 18.

In step 204, controller server 18 may update an end host database based on information retrieved from the packet. The end host database may include entries for each known end host in the network. Each entry may include end host address information such as a hardware address (e.g., MAC or other Ethernet address) and a network address (e.g., IP address or other protocol addresses). Controller server may retrieve the hardware address and network address of an end host by retrieving source and/or destination addresses from header fields in the packet (as an example).

In step 206, controller server 18 may identify whether the packet is an ARP request. Controller server 18 may identify an ARP request packet based on information retrieved from the packet (e.g., header fields retrieved from the packet that identifies the packet as an ARP request). If controller server 18 identifies that the new packet is an ARP request packet, the operations of step 210 may be performed. If controller server 18 identifies that the new packet is not an ARP request packet, the operations of step 208 may be performed.

In step 208, controller server 18 may process the new packet normally. For example, controller server 18 may generate packet forwarding paths for the new packet (e.g., by providing flow table entries to client switches in the network that instruct the client switches to forward the new packet from a packet source to a packet destination).

In step 210, controller server 18 may identify whether or not the destination end host of the ARP packet is known (e.g., whether or not a corresponding hardware address is known for a network address retrieved from the destination network address field of the ARP packet). Controller server 18 may use information stored in end host databases such as generated in step 204 to identify whether the destination end host of the ARP packet is known. If the ARP destination end host is unknown, controller server 18 may perform the operations of step 212. If the ARP destination end host is known, controller server 18 may perform the operations of step 214.

In step 212, controller server 18 may use network topology information to optimize the discovery of the destination end host specified by the ARP request. To optimize the discovery of the destination end host, controller server 18 may instruct client switches to broadcast the ARP request, convert the ARP request into a unicast ARP request destined for the destination end host, or forward the ARP request from switch ports that are on the edge of the network (e.g., from switch ports that are not coupled to other switches in the network).

In step 214, controller server 18 may process the ARP request based on network topology information. To process the ARP request, controller server 18 may form a controller-generated ARP request based on information retrieved from the end host database or instruct switches to forward the ARP request to the destination end host. For example, controller server 18 may convert the ARP request into a unicast ARP request such as unicast ARP request 123 of FIG. 9B and direct client switches in the network to forward the unicast ARP request to the ARP destination end host. As another example, controller server 18 may form a controller-generated ARP reply based on the ARP request (e.g., controller-generated ARP reply 124A of FIG. 10 or controller-generated ARP request 124B of FIG. 12). Controller server 18 may provide controller-generated ARP replies to a client switch that is coupled to the end host that sent the ARP request (e.g., a client switch coupled directly to the end host or coupled to the end host through non-client switches).

Figure 14:
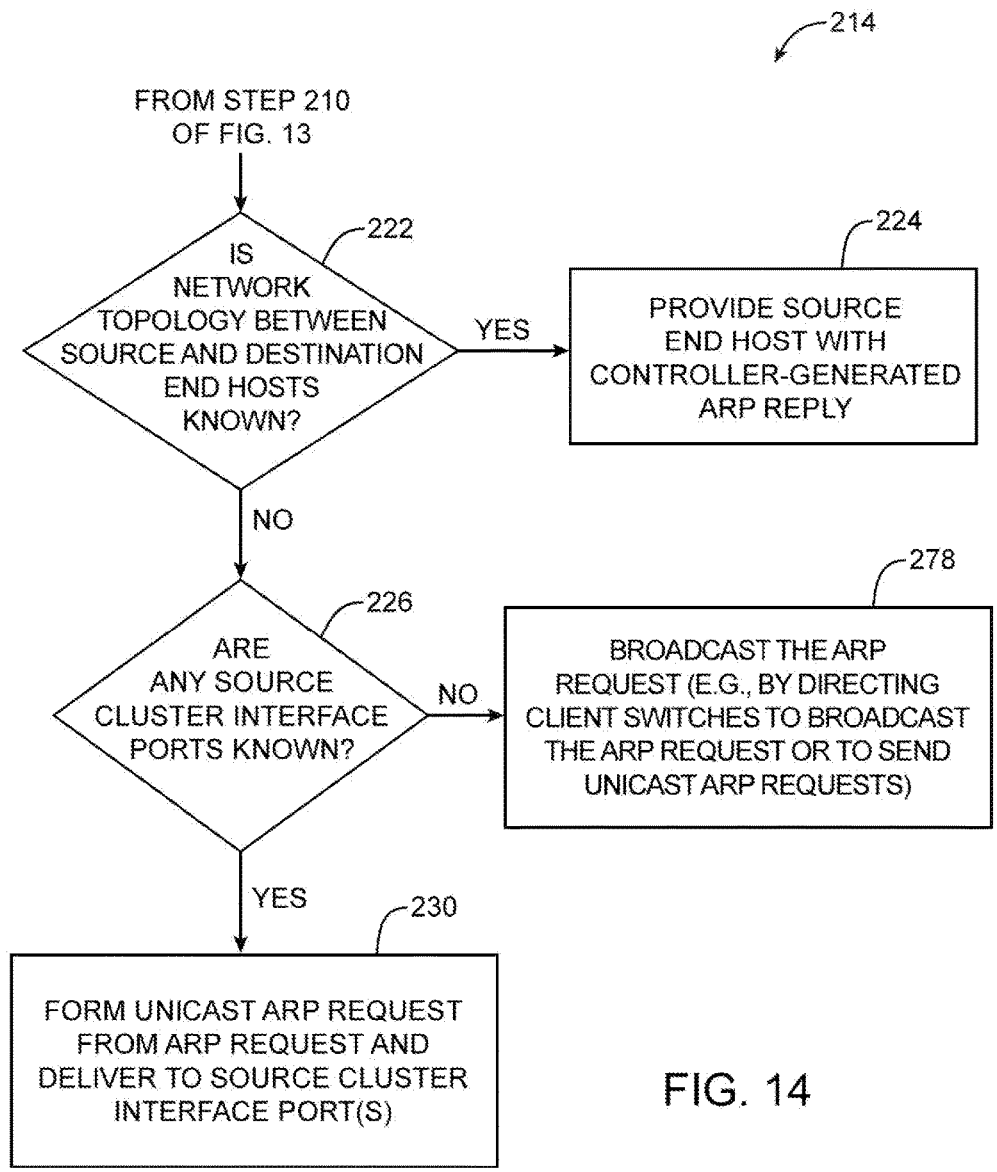
FIG. 14 is a flow chart of illustrative steps that may be performed by a controller to process an ARP packet based on network topology information in accordance with an embodiment of the present invention.

If desired, the illustrative steps of the flowchart shown in FIG. 14 may be performed by a controller server (or other controller) to process ARP requests for which the ARP destination end host is known (e.g., step 214 of FIG. 13 may include the steps of FIG. 14).

In step 222, controller server 18 may identify whether or not network topology information between the ARP source and destination end hosts is known. For example, controller server 18 may identify switch clusters that are associated with the source and destination end hosts. As another example, controller server 18 may determine a forwarding path through the network (e.g., through client switches and non-client switches) from the source end host to the destination end host. In this scenario, the forwarding path may include a list of ports and associated switches through which packets may flow from the source end host to the destination end host.

If the network topology between the source and destination end hosts is known, the operations of step 224 may be performed. If the network topology between the source and destination end hosts is not known (e.g., if controller server 18 is unable to determine a forwarding path between the two end hosts), the operations of step 226 may be performed.

In step 224, controller server 18 may form a controller-generated ARP reply that corresponds to the ARP request and provide the controller-generated ARP reply to the source end host. For example, controller server 18 may form controller-generated ARP reply 124A of FIG. 10 or controller-generated ARP reply 124B of FIG. 12. Controller server 18 may provide the controller-generated ARP reply to the source end host by sending the reply to a client switch that is coupled to the source end host (e.g., via network paths 66) and directing the client switch to send the reply to the source end host.

In step 226, controller server 18 may identify whether or not source cluster interface ports are known. In other words, controller server 18 may identify whether or not the client switch cluster associated with the source end host is coupled to non-client switches at known interface ports. For example, controller server 18 may identify interface port 108A for source cluster 102A in network 100 of FIG. 8. Known interface ports for a given client switch cluster may be retrieved from a database on controller server 18 or determined from network topology information.

If controller server 18 is unable to identify any source cluster interface ports (e.g., if no interface ports exist for the source cluster or if controller server 18 does not yet know the interface ports), the operations of step 228 may be performed. If controller server 18 is able to identify a source cluster interface port, the operations of step 230 may be performed.

In step 228, controller server 18 may broadcast the ARP request. For example, controller server 18 may instruct client switches in the network to broadcast the ARP request to all ports or convert the ARP request into a unicast ARP request and instruct a client switch in the network to send the unicast ARP request from each port of that client switch.

In step 230, controller server 18 form one or more unicast ARP requests from the received ARP request and deliver the unicast ARP requests at identified source cluster interface ports. For example, controller server 18 may convert a broadcast ARP request into a unicast ARP request. Controller server 18 may deliver the unicast ARP requests by instructing client switches associated with the identified interface ports to send the unicast ARP requests from the interface ports (e.g., from the ports that are coupled to non-client switches).

By performing the steps of FIG. 13 (and optionally FIG. 14) to reduce broadcasting of ARP requests using network topology information, a controller such as controller server 18 may reduce network traffic and help improve network performance. The example of controller server 18 processing ARP requests in FIGS. 13 and 14 is merely illustrative. Controller server 18 may process any desirable network packets that request hardware address information of end hosts in a network. For example, controller server 18 may process packets sent using the neighbor discovery protocol (NBP) that request hardware addresses that correspond to Internet Protocol Version 6 (IPv6) addresses or may process packets that request hardware addresses that correspond to other protocols or other versions of the Internet Protocol.

The use of one or more centralized controllers such as controller server 18 to control network switches is merely illustrative. If desired, any type of controller (e.g., a controller implemented on computing equipment) that controls a network of packet forwarding systems may be used to process network packets such as ARP requests (e.g., to perform the steps of the flowcharts of FIGS. 13 and 14).

FIG. 15 shows an illustrative example in which controllers 302 may be distributed on switches 14 throughout network 300. Controllers 302 may be distributed on some or all of network switches 14. Controller clients such as controller client 30 may communicate with one or more of controllers 302 via network communications links (e.g., controllers 302 may send instructions to controller client 30 via the communications links). Controllers 302 may communicate with each other to collectively control switches 14 or may individually control switches 14.

As an example, controllers 302 may collectively control network 300 by communicating with each other. Controllers 302 may share information relating to network topology, network traffic, end hosts that are coupled to switches 14, etc. By sharing network information, controllers 302 may be able to gather network topology information and use the network topology information to process ARP packets or other packets that request hardware address information.

The foregoing is merely illustrative of the principles of this invention and various modifications can be made by those skilled in the art without departing from the scope and spirit of the invention.

What is claimed is:

1. A method of operating a network using a controller to control client switches in the network based on an OpenFlow protocol, the method comprising:
 with the controller, providing, based on the OpenFlow protocol, flow table entries to a first cluster of the client switches and a second cluster of the client switches to control the client switches in the first and second clusters of client switches to perform packet forwarding operations, wherein each of the client switches in the first and second clusters includes a respective controller client that is controlled by the controller under the OpenFlow protocol, wherein the first cluster of client switches is isolated from the second cluster of client switches by at least one non-client switch without any controller clients that are controlled under the OpenFlow protocol;
 with the controller, sending, under the OpenFlow protocol, Link Layer Discovery Protocol (LLDP) probe packets to the client switches in the network for gathering network topology information from the client switches;
 with the controller, identifying whether a network packet that is generated by a source end host coupled to the first cluster of client switches and that is received by the controller through the first cluster of client switches under the OpenFlow protocol is requesting a hardware address of a destination end host coupled to the second cluster of client switches;
 in response to identifying that the network packet is requesting the hardware address of the destination end host, processing the network packet with the controller using the gathered network topology information;
 storing source address information retrieved from the network packet in an end host database; and
 identifying whether the hardware address of the destination end host is known by examining previously stored source address information in the end host database, wherein processing the network packet with the controller comprises:
  based on the network topology information, identifying whether a packet forwarding path through the first and second clusters of client switches from the source end host to the destination end host is known;
  in response to identifying that the packet forwarding path is known, forming a controller-generated ARP reply with the controller and providing the controller-generated ARP reply to the source end host through a given client switch in the first cluster of client switches; and
  in response to identifying that the packet forwarding path is not known, instructing, under the OpenFlow protocol, the given client switch to broadcast the network packet over each port of the given client switch.

2. The method defined in claim 1 wherein identifying whether the network packet is requesting the hardware address of the destination end host comprises:
 retrieving packet information from packet header fields of the network packet.

3. The method defined in claim 1 wherein identifying that the network packet is requesting the hardware address of the destination end host comprises:
 identifying that the network packet is an Address Resolution Protocol request.

4. The method defined in claim 1 wherein each of the client switches have associated ports, wherein the network packet has a destination address header field, wherein the given client switch is coupled to the source end host, and wherein instructing the given client switch to broadcast the network packet comprises:
 forming a modified packet by storing the hardware address of the destination end host in the destination address header field of the network packet; and
 instructing the given client switch that is coupled to the source end host to send the modified packet from each of the ports of the given client switch.

5. A method of fulfilling hardware address requests in a network of switches, the method comprising:
 with a controller, instructing, under an OpenFlow protocol, source and destination clusters of client switches in the network to send link layer discovery protocol (LLDP) messages to the controller, wherein the source cluster of client switches is isolated from the destination cluster of client switches by at least one intervening non-client switch, wherein each of the client switches in the destination and source clusters includes a respective controller client that is controlled by the controller under the OpenFlow protocol, and wherein each of the intervening non-client switches lacks any controller client that is controlled under the OpenFlow protocol;
 with the controller, gathering network topology information about the source and destination clusters of client switches and the at least one intervening non-client switch based on the LLDP messages sent by the source and destination clusters of switches;
 with the controller, identifying whether a network packet received under the OpenFlow protocol from a switch in the source cluster of client switches is an Address Resolution Protocol request packet;
 with the controller, determining whether a network topology between a packet source end host coupled to the source cluster of client switches and a packet destination end host coupled to the destination cluster of client switches is known, wherein the network packet is generated by the packet source;
 with the controller, in response to determining that the network topology between the packet source end host and the packet destination end host is known, providing the packet source end host with a controller-generated Address Resolution Protocol reply through the source cluster of client switches under the OpenFlow protocol;
 with the controller, in response to determining that the network topology between the packet source end host and the packet destination end host is unknown, determining whether any cluster interface ports between the source cluster of client switches and the at least one non-client switch are known;
 with the controller, in response to determining that no cluster interface ports between the source cluster of client switches and the at least one non-client switch are known, broadcasting the Address Resolution Protocol request packet; and
 with the controller, in response to determining that a cluster interface port between the source cluster of client switches and the at least one non-client switch is known, generating a unicast Address Resolution Protocol request packet from the Address Resolution Protocol request packet and providing the generated unicast Address Resolution Protocol request packet to the at least one intervening non-client switch through both the cluster interface port and a given switch from the source cluster of client switches.

6. The method defined in claim 5 wherein the Address Resolution Protocol request packet has a destination address header field and wherein generating the unicast Address Resolution Protocol request packet comprises:
storing the hardware address of the packet destination end host in the destination address header field of the Address Resolution Protocol request packet.

7. The method defined in claim 6 further comprising:
with the controller, generating packet forwarding rules that form a packet forwarding path between the packet source end host and the packet destination end host based at least on the gathered network topology information; and
providing the source and destination clusters of client switches with the generated packet forwarding rules to implement the packet forwarding path between the packet source end host and the packet destination end host.

8. The method defined in claim 5, wherein broadcasting the Address Resolution Protocol request packet comprises instructing, under the OpenFlow protocol, the given switch to broadcast the Address Resolution Protocol request packet at all ports of the given switch.

9. The method defined in claim 5, further comprising:
with the controller, retrieving a network address of the packet destination end host from the Address Resolution Protocol request packet;
with the controller, determining whether a hardware address of the packet destination end host corresponding to the retrieved network address of the packet destination is stored in a database;
with the controller, in response to determining that the hardware address is stored in the database, determining whether the network topology between the packet source end host and the packet destination end host is known; and
with the controller, in response to determining that the hardware address is not stored in the database, optimizing discovery of the packet destination based on the gathered network topology information.

10. A method of operating a network having a controller to control network traffic through switches in the network that forward network packets through the network, the method comprising:
with the controller, providing, under an OpenFlow protocol, flow table entries to a source client switch cluster of the switches in the network and to a destination client switch cluster of the switches in the network, wherein the source client switch cluster is isolated from the destination client switch cluster by at least one intervening non-client switch, wherein each of the switches in the destination client switch cluster and each of the switches in the source client switch cluster includes a respective controller client that is controlled by the controller under the OpenFlow protocol, and wherein each of the intervening non-client switches lacks any controller client that is controlled under the OpenFlow protocol;
with the controller, receiving, through the source client switch cluster and under the OpenFlow protocol, a network packet generated by a source end host coupled to the source client switch cluster;
with the controller, identifying whether the network packet generated by the source end host and received through the source client switch cluster under the OpenFlow protocol is requesting a media access control (MAC) address of a destination end host that is coupled to the destination client switch cluster and that is separate from the source end host, wherein the source and destination end hosts are separate from the switches;
in response to identifying that the network packet is requesting the MAC address of the destination end host, retrieving, with the controller, the MAC address of the destination end host from a database using the controller and providing, under the OpenFlow protocol, the MAC address of the destination end host retrieved from the database to the source end host through the source client switch cluster, wherein the source end host has knowledge of the MAC address of the destination end host after the controller has provided the MAC address of the destination end host to the source end host through the source client switch cluster under the OpenFlow protocol.

11. The method defined in claim 10 wherein providing the hardware address to the source end host comprises:
with the controller, forming an Address Resolution Protocol reply packet that corresponds to the network packet; and
sending, under the OpenFlow protocol, the Address Resolution Protocol reply packet to the source end host through the source client switch cluster.

12. The method defined in claim 11 further comprising:
with the controller, sending, under the OpenFlow protocol, the network packet to the destination end host through the destination client switch cluster without passing the network packet through the at least one non-client switch;
with the controller, receiving, under the OpenFlow protocol, a reply packet from the destination end host through the destination client switch cluster; and
with the controller, sending, under the OpenFlow protocol, the reply packet to the source end host through the source client switch cluster without passing the reply packet through the at least one non-client switch, wherein the reply packet identifies the MAC address of the destination end host.

13. The method defined in claim 12 wherein the flow table entries provided to the destination client switch cluster direct the switches in the destination client switch cluster to forward the network packet to the destination end host.

14. The method defined in claim 13 wherein forming the Address Resolution Protocol reply packet that corresponds to the network packet comprises:
with the controller, forming the Address Resolution Protocol reply packet with a header that identifies both an Ethernet source address that is reserved for the controller and the MAC address of the destination end host.

15. The method defined in claim 14, wherein the source and destination end hosts do not perform any network packet forwarding operations.

16. The method defined in claim 10, further comprising:
with the controller, receiving, under the OpenFlow protocol, the network packet from a first port of a first switch in the source client switch cluster, wherein the first switch is interposed between the controller and the source end host, wherein a second port of the first switch is coupled to the source end host, and wherein providing the MAC address of the destination end host to the source end host comprises conveying, under the OpenFlow protocol, information identifying the MAC address of the destination end host to the source end host through the first switch.

17. The method defined in claim 16, wherein a second switch in the destination client switch cluster is coupled to the destination end host, the method further comprising:

with the controller, providing, under the OpenFlow protocol, a first flow table entry to the first switch, wherein the first flow table entry matches on a header field of an additional network packet received by the first switch from the source end host over the second port of the first switch, wherein the header field comprises a destination MAC address header field that includes the MAC address of the destination end host provided to the source end host by the controller, and wherein the first flow table entry has an action field that directs the first switch to forward the additional network packet over a third port of the first switch.

18. The method defined in claim 17, the method further comprising:

providing, under the OpenFlow protocol, additional flow table entries to the source client switch cluster and to the destination client switch cluster that configure the source and destination client switch clusters to forward the additional network packet to the second end host through a third switch in the source client switch cluster, a cluster interface port between the third switch and the at least one intervening non-client switch, a second cluster interface port between a fourth switch in the destination client switch cluster and the at least one intervening non-client switch that is not operated under the OpenFlow protocol, and the second switch, without conveying the additional network packet through the controller.

\* \* \* \* \*